Sept. 20, 1966 E. P. HERZOG ETAL 3,273,209
ROTOR CONDUCTOR CASTING APPARATUS
Filed May 22, 1963 2 Sheets-Sheet 2
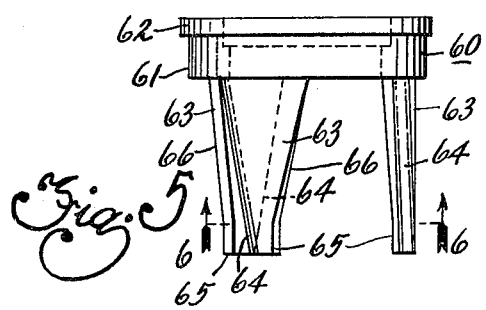
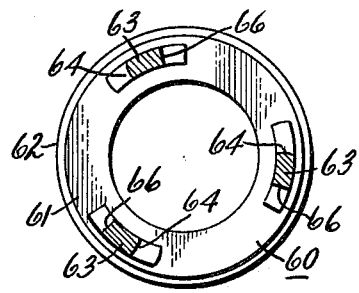
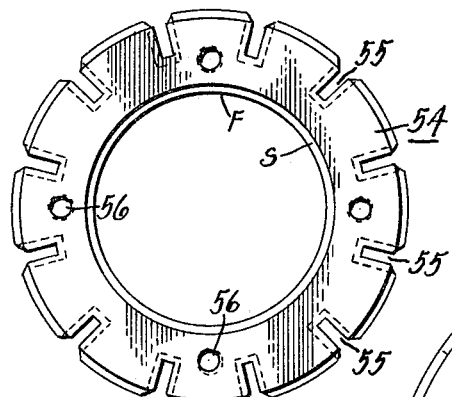
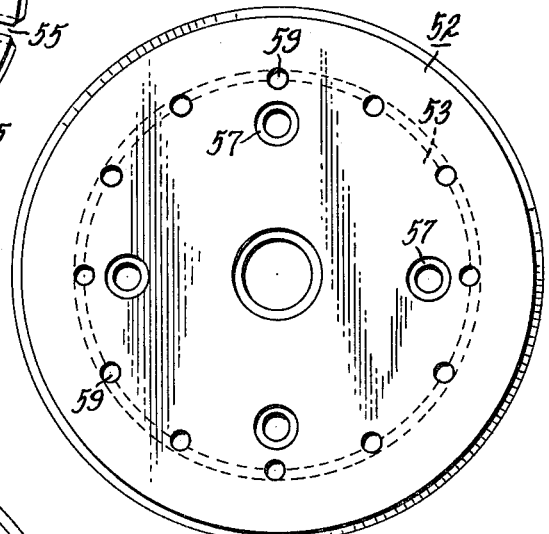
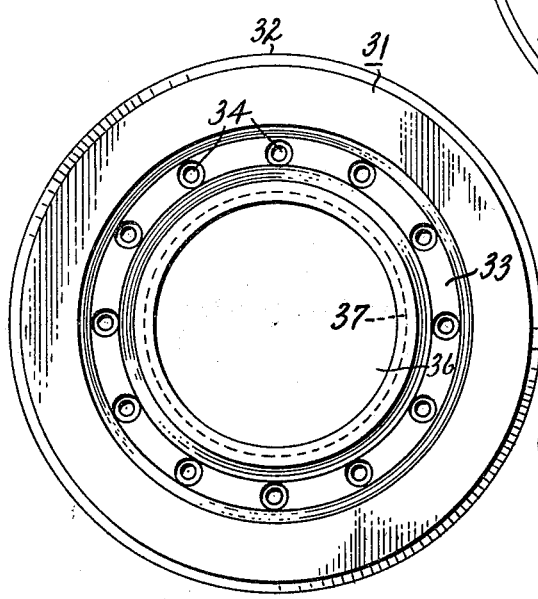
INVENTORS
ELLWOOD P. HERZOG
RAYMOND C. HOEFLING
ALBERT B. MEWHINNEY
BY
THEIR ATTORNEY

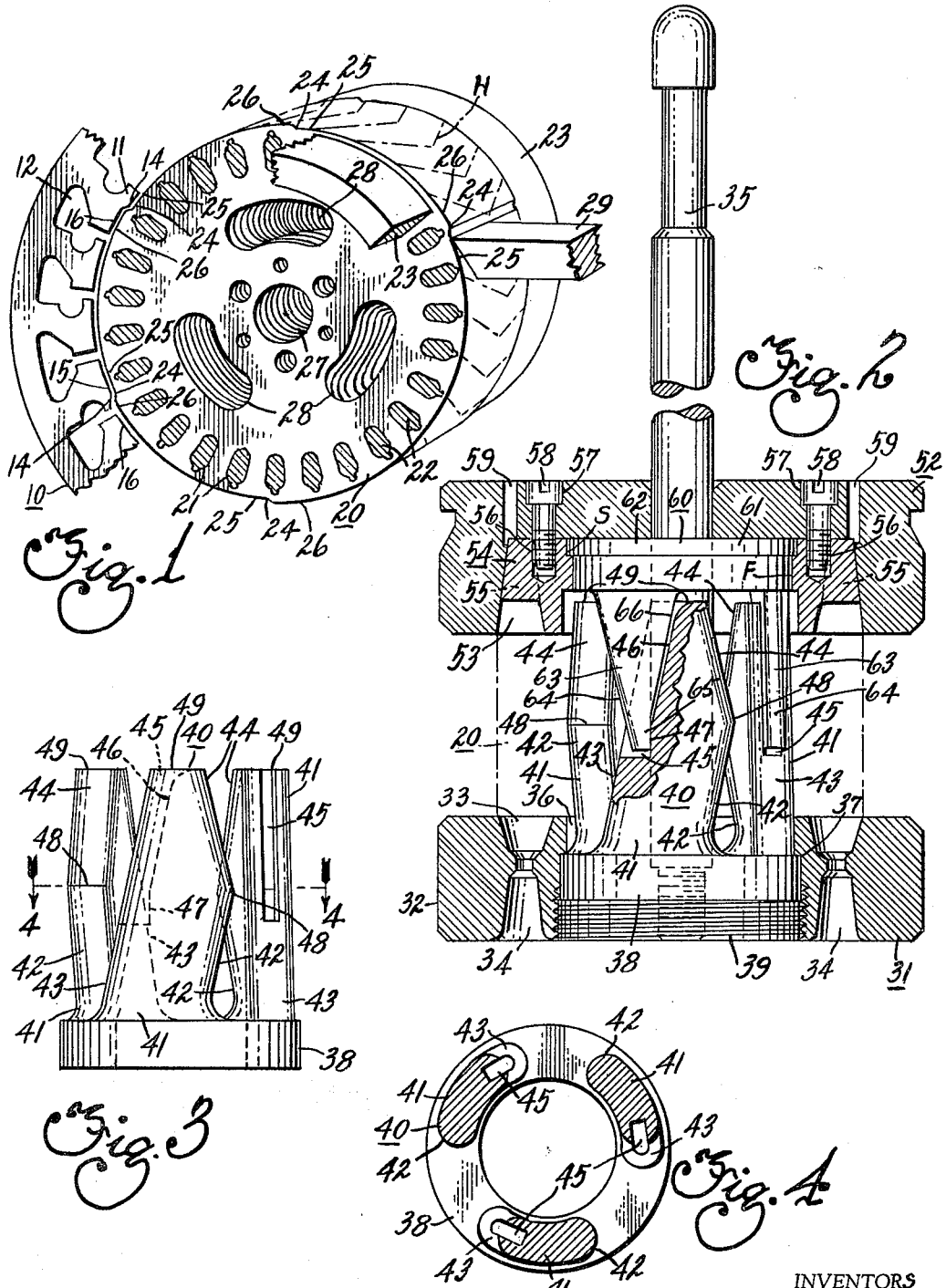

United States Patent Office 3,273,209
Patented Sept. 20, 1966

3,273,209
ROTOR CONDUCTOR CASTING APPARATUS
Ellwood P. Herzog, Raymond C. Hoefling, and Albert B. Mewhinney, Dayton, Ohio, assignors to General Motors Corporation, Detroit, Mich., a corporation of Delaware
Filed May 22, 1963, Ser. No. 282,416
3 Claims. (Cl. 22—58)

This invention relates to manufacture of components of a dynamoelectric machine, and, more particularly, to a method of changing skew of laminations into a herringbone configuration for a dynamoelectric machine rotor means.

An object of this invention is to provide a new and improved mechanized procedure for instantaneously forming a herringbone skew arrangement of a laminated magnetic core of a dynamoelectric machine rotor component.

Another object of this invention is to provide a method of changing skew of rotor laminations prior to casting a metal squirrel cage winding relative to slots thereof into a herringbone pattern obtained by an internal aligning step which instantaneously establishes lamination arrangement free of any external telltale slot previously needed for double-key external alignment.

Another object of this invention is to provide herringbone rotor lamination arrangement readily to assure decrease of sideward thrust of such a dynamoelectric machine component made in steps of positioning laminations to have at least plural internal cutouts complementary at least in part to corresponding projections of a die casting die portion at one end, telescoping an opposite die casting die portion with integral probe means also to fit into the plural cutouts and thereby instantaneously shifting rotor laminations of at least part of a lamination stack-up in a direction of skew opposite to that of remaining laminations limited by interfit of projections and probe means subject to casting a metal winding portion thereto.

A further object of this invention is to provide a method of changing skew of rotor laminations prior to casting a metal squirrel cage winding relative to slots thereof into a herringbone pattern achieved in steps of positioning laminations to have at least plural internal cutouts complementary at least in part to corresponding upward projecting means of a die casting die portion having an end-ring-forming cavity as well as a passage thereto, dropping an opposite die casting die portion having an end-ring-forming and venting portion as well as downwardly extending probe means therewith also to fit into the plural cutouts and thereby instantaneously shifting laminations of at least part of a lamination stack-up in a direction of skew opposite to that of remaining laminations held to limit stops in opposite directions of skew by telescopic interfit of projecting means and probe means during casting of flowable metal into lamination slots and integral opposite end rings.

Another object of this invention is to provide improvement in manufacture of squirrel-cage-winding rotor means of electric motors particularly having slotted rotor laminations with substantially step-like progressive tapering along peripheral edging corresponding to that of slotted stator laminations having tapered peripheral edging stamped from corresponding sheet metal to save material though providing and maintaining stator lamination tapered peripheral edging while the rotor laminations have at least plural internal cutouts subject to positioning complementary at least in part to corresponding upward projecting means of a die casting die portion having an end-ring-forming cavity, telescoping an opposite die casting die portion also with an opposite end-ring-forming cavity and with integral probe means also to fit into the plural cutouts for instantaneously shifting rotor laminations of a least part of a lamination stack-up in a direction of skew opposite to that of remaining laminations limited in rotative movement by interfit of projections and probe means subject to casting a metal winding portion thereto.

Further objects and advantages of the present invention will be apparent from the following description, reference being had to the accompanying drawings wherein preferred embodiments of the present invention are clearly shown.

In the drawings:

FIGURE 1 is a fragmentary and perspective view of stator and rotor components to have features obtained by procedure in accordance with the present invention.

FIGURE 2 is an elevational view of telescoping die cast die portions for use in oppositely skewing rotor laminations as outlined in FIGURE 1 and having features in accordance with the present invention.

FIGURE 3 is a side view of a lamination stack-up member having upward projections for use with a die casting die portion shown in a lower part of FIGURE 2.

FIGURE 4 is a cross-sectional view taken along line 4—4 in FIGURE 3.

FIGURE 5 is a side view of a laminating shifting member having downwardly extending probe means for use with a die casting die portion shown in an upper part of FIGURE 2.

FIGURE 6 is a cross-sectional view taken along line 6—6 in FIGURE 5.

FIGURE 7 is a plan view of an end-ring-forming insert means used with a die casting die portion shown in an upper part of FIGURE 2.

FIGURE 8 is a plan view of a die casting die portion shown in an upper part of FIGURE 2.

FIGURE 9 is a plan view of a die casting die portion shown in a lower part of FIGURE 2.

For economy in use of sheet metal from which stator and rotor component laminations can be stamped, it is possible to utilize a rotor-stator progressive die stamping arrangement as disclosed by copending applications S.N. 125,190—Zimmerle, et al. and S.N. 125,191—Zimmerle both filed July 19, 1961 and both belonging to the assignee of the present invention now Patents 3,202,851—Zimmerle et al. dated August 24, 1965 and 3,110,831—Zimmerle dated November 12, 1963, respectively. In such a progressive die stamping operation there can be a formation of corresponding stator and rotor laminations formed correspondingly without waste of material, for example, either centrally of a stator lamination component or radially outwardly of a rotor lamination component. However, there are some instances where previously use of such progressive die stamping operations could have shortcomings and limitations such as in the formation of so-called skewed rotor means and/or stator lamination components having peripheral edging with a tapered or modified configuration such that air gap between stator lamination tooth means and rotor periphery can be greater or less than air gap between leading and trailing locations of a particular span of the stator and rotor components between each other. Reference can be made to expired patents concerning such air gap variation for A.C. induction dynamoelectric machine means as well as shaded pole dynamoelectric machine means as shown by 1,002,718—Marelli issued September 5, 1911; 1,761,836—MacFarlane, et al. issued June 3, 1930; 1,884,140—Nickle issued October 25, 1932 and 2,185,990—Schurch issued January 2, 1940.

In FIGURE 1 of the drawings there is provided a fragmentary showing of a stator lamination means generally indicated by numeral 10 including a plurality of integral sheet metal teeth 11 defining slots 12 into which appropriate winding means can be fitted. Radially inner edging defined by the teeth 11 of the sheet metal lamination means 10 can differ as evidenced, for example, by a series of step or shoulder portions 14 resulting from variation in distance outwardly from an axis coinciding with the axis of rotor turning such that an edging portion 15 is further inwardly toward this axis than is an edging portion 16 which is located radially outwardly farther for variation in ultimate air gap between the stator and rotor lamination components of a dynamoelectric machine.

When utilizing a progressive die stamping operation for formation of such a stator lamination means 10, it is generally necessary that a mating or corresponding configuration is provided for individual laminations of a rotor means or armature component generally indicated by numeral 20 in FIGURE 1. This rotor component or armature means 20 is formed by a stack-up of a plurality of laminations each having radially located slots 21. Molten metal such as cast aluminum can be filled into these slots 21 to form a so-called squirrel cage winding means including conductor bars 22 joined at opposite ends by end ring means such as 23 of which a portion is shown in FIGURE 1. Each of the rotor laminations includes an offset or shoulder means 24 corresponding to the shoulder means 14 formed by the progressive die stamping operation such that differing edging portions 25 and 26 result correspondingly to the edging portions 15 and 16, respectively. Provision of any external slot or keyway in the outer periphery of each of the rotor laminations is impractical since progressive die tooling would not permit a feasible operation to form the shoulder means 14 as well as the different edging portions 15 and 16 in the stator lamination means in the event any such cutout or keyway for outer peripheral rotor lamination alignment were to be provided.

The progressive die stamping operation can provide a central opening 27 through the rotor lamination means which can be mounted or suitably press-fitted onto an outer periphery of a shaft of a dynamoelectric machine means and the like. A plurality of internal cutouts such as three crescent-like passages 28 indicated in FIGURE 1 can be provided in rotor lamination locations radially intermediate the shaft opening 27 and slots 21. The purpose of these cutouts 28 will become more apparent in the following description. These cutouts 28 are instrumental for an internal skewing arrangement which permits use of progressive die operation for both stator and rotor lamination formation subject to an external machining or cutting of the rotor means 20 by use of a tool 29 shown in FIGURE 1 and adapted to form a substantially cylindrical outer rotor periphery that is concentric as to the shaft opening 27 yet having variation in air gap as to peripheral edging of the stator lamination means 10.

It is to be understood that the cutting tool 29 is illustrated in FIGURE 1 only to indicate that the irregular edging of the rotor lamination means is to be eliminated in a final rotor assembly which is first subjected to several steps in accordance with the present invention. FIGURE 2 provides an elevational view of telescoping die casting die portions for use in oppositely skewing rotor laminations into a herringbone configuration and the like such as illustrated by an expired Patent 1,861,059—Johnson issued May 31, 1932. Such a herringbone configuration indicated by a reference H in FIGURE 1 can be formed advantageously by internal alignment achieved by the cooperative telescoping of the die casting die portions shown in FIGURE 2 and adapted to have projections and probe means to fit into the crescent-like cutouts 28 noted earlier. Thus, in FIGURE 2 there is shown a first die casting die portion generally indicated by numeral 31 including an annular body portion 32 with a recess 33 on one side thereof for formation of end ring means during casting of metal thereto through passage means 34. This annular recess 33 is located substantially axially in alignment with the slots 21 and concentrically outwardly from a shaft-like central member 35 which is fitted through the aligned central openings 27. The body portion 32 has an inner axial opening 36 defined by an inner periphery of the body portion 32 that includes a shoulder 37 against which a base portion 38 is fitted and held by a suitable cover plate 39.

This base portion 38 can be seen in further detail in FIGURES 3 and 4 of the drawings which illustrate a lamination stackup member generally indicated by numeral 40 including upward or axially extending projections 41 extending integrally to one side of the base portion 38. Each of the projections 41 has a predetermined configuration which is crescent-like in cross section at least in part to complement the similar cutouts 28 as the rotor laminations are stacked axially onto the projections 41. The projections 41 have a predetermined angular relationship as to the base portion 38 as well as the shaft-like member 35 such that substantially one-half of the axial distance of the projections 41 can assure a skew of the rotor laminations to have a lead in one direction such as to the right in the views of FIGURES 2 and 3 of the drawings. This "right-handed" lead is represented by edging 42 and 43 of the projections in an end thereof immediately adjacent to the base portion 38 subject to sufficient spacing axially to permit formation of the end ring means 23 by casting of metal into the annular recess 33. An end of each projection 41 in a location remote from the base portion 38 can include an edging 44 integral with the projection 41 for each crescent-like member which has a recess 45 extending substantially longitudinally thereof for a distance slightly over halfway as can be seen in views of FIGURES 2 and 3 of the drawings. This recess 45 includes an inner edging 46 that extends substantially parallel to the edging 43 at least in a location remote from the base portion 38 and corresponding for the distance of the edging 44. A substantially right-angled stop means or shoulder 47 is formed by an end of the recess 45 in a location toward the base portion 38. Juncture of the edging 42 and 44 of the projections 41 results in an apex 48 corresponding to a change in direction of the slanted skewing or aligning of the slots 21 of the rotor laminations into a herringbone configuration H indicated in FIGURE 1 of the drawings. Each of the projections 41 terminates in a blunt end or flattened surface 49 subject to contoured rounding therefrom into the recess 45 to facilitate telescopic mating of a probe means extending in a direction opposite though substantially complementary to the projections 41.

Such probe means can be seen in FIGURE 2 as well as in views of FIGURES 5 and 6. Referring first to the illustration of FIGURE 2, there is shown a secondary die casting die portion generally indicated by numeral 52 including an annular body portion with a tapered inner periphery at least part of which defines an annular recess 53 for formation of end ring means such as 23 on an opposite side of a rotor assembly. This annular recess 53 is further defined by an end-ring-forming insert means 54 which is centrally apertured and which includes a plurality of tapered-edge recesses 55 as can be seen in views of FIGURES 2 and 7 of the drawings. These recesses 55 extending axially away from the rotor means and integrally with cast metal end ring means formed by the recess 53 can provide ventilating fan blades integral with the one end ring means. The insert means 54 can be provided with a plurality of tapped holes 56 as indicated in views of FIGURES 2 and 7 such that suitable screws can be fitted through passages 57 which are counterbored as appears in views of FIGURES 2 and 8 of the drawings. A screw means 58 fitted through the passages such as 57 and threaded into the tapped opening 56 has been indicated in FIGURE 2 of the drawings. A plurality of vent openings 59 extends axially through the secondary die casting die portion 52 as can be seen in the view of FIGURE 8 and these vent openings 59 are substantially axially in alignment with the recess 53 and/or fan blade cutouts or spaces 55. It is to be understood that any excess metal which may pass into such vent openings as well as metal left in the passages 34 can be removed such as by a suitable cutting or machining operation for cleaning of peripheral surfacing of the end rings and/or fan blades.

The insert means 54 includes a radially inwardly extending flange F forming a shoulder S on the one side thereof that can be best seen in the view of FIGURE 2 and also in the view of FIGURE 7.

A lamination shifting member generally indicated by numeral 60 can be seen in views of FIGURES 2, 5 and 6. This lamination shifting member 60 includes an annular body portion 61 which is adapted to be fitted radially inwardly and in alignment with the flange means F integral with the insert means 54. The body portion 61 includes a laterally outwardly projecting annular extension 62 which is adapted to be held against the secondary die casting die portion 52 by engagement of the shoulder S of the insert means 54 as shown in FIGURE 2. A plurality of probe means 63 can project axially to one side of the body portion 61 such that an annular edging 64 is located substantially parallel to edging 44 of projection 41. An end 65 of each probe means extends into the recess 45 and abuts against the shoulder forming portion 47 of the projection 41 as can be seen in the view of FIGURE 2. An edging 66 of the probe means 63 fits substantially complementary to the surface or edging 46 defined inside the recess or cutout 45.

The herringbone rotor lamination arrangement can be readily achieved to assure decrease of sideward thrust of such a dynamoelectric machine component made in steps of positioning laminations having at least plural internal cutouts in a crescent-like shape complementary at least in part to corresponding projections of a first die casting die portion followed by telescoping an opposite secondary die casting die portion with integral probe means also to fit into the plural cutouts and thereby instantaneously shifting rotor laminations of at least part of a lamination stack-up in a direction of skew opposite to that of remaining laminations limited as to amount of rotary shifting of the laminations as to each other due to interfit of projections and probe means subject to casting a metal winding portion thereto. This instantaneous shifting of the rotor laminations can occur, for example, by dropping the secondary die casting die portion 52 downwardly into a telescoping position with the projections 41 being engaged by the probe means 63 particularly in the cutout or recess 45 of the projections 41. All need for any external alignment grooves or keyways in the rotor laminations can be eliminated and thus the progressive die stamping operation of sheet metal can be used to accomplish formation of both stator and rotor laminations with a saving of material and without any external keyway or slot which would not be feasible when both stator and rotor laminations are to be formed from the sheet metal. However, it is to be understood that the internal aligning for formation of such a herringbone arrangement can be used advantageously for rotor components per se regardless of the stator lamination configuration and/or sheet metal stamping operations for formation thereof. The present invention permits mechanized formation of herringbone arrangement for dynamoelectric machine rotor components which are formed of a plurality of individual laminations stacked and aligned in accordance with the present invention subject to casting of molten metal thereto which solidifies and holds the laminations together in a rotor assembly that can be carried and journalled by a suitable shaft means. Such a herringbone rotor configuration can be used to particular advantage with a minimum expenditure for time and material to produce such rotor components. Casting a molten metal squirrel cage winding means to the slots accompanied by integral formation of end ring means on each of opposite sides of the rotor component can be accompanied by a machining off of the outer periphery of the rotor laminations to open the slots filled with cast metal in radial locations. The metal projections extending axially from cast end ring structure due to provision of vent passages as well as sprue or gate openings in the first and second die casting die portions can be mashed around the end ring periphery and/or can be machined off where necessary.

It is to be understood that a suitable clamp means can be provided if deemed necessary to hold the first and second die casting die portions on opposite sides of the stacked and herringbone arranged rotor laminations until after the molten metal has been supplied thereto and permitted to solidify sufficiently. Interaction of the projections and probe means can serve as a stop for limiting shifting of the laminations as to each other once the telescoping has occurred. Edging such as 42, 43, 44 and 64 as well as interfit of edging 46 and 66 can provide such limits for shifting of laminations relative to each other.

While the embodiments of the present invention as herein disclosed constitute preferred forms, it is to be understood that other forms might be adopted.

What is claimed is as follows:

1. A casting die means for achieving a herringbone skew rotor lamination arrangement, comprising: a first moveable die casting die portion, having an annular end-ring-forming recess therein as well as carrying a plurality of fixed spaced axial projections adapted to receive slotted laminations and align a portion of said laminations, each said projection is located radially inward of said end-ring-forming recess and arranged concentric thereto, and each said projection has a leading edging defining one surface of said projection in a predetermined angular herringbone configuration, and each said projection has a second edging defining an opposite surface to that of said one surface, whereby said opposite surface is continuous along a plane and is substantially parallel to said one surface at a point from the die extending outwardly to substantially opposite the vertex of said herringbone configuration to align said portion of said laminations, said one surface and said opposite surface relatively converge into a taper form from a point opposite the vertex to the projection end; and a second moveable die casting die portion having an opposite annular end-ring-forming recess and a plurality of axial tapered probe means, located concentrically and inwardly thereof to complement said taper form at said second edging of said axial projections, respectively, whereby, when brought into operating engagement with said first die the probe means are adapted to simultaneously align the other portion of said laminations into said skew configuration by way of the slots when the relative coaction of the die portions result in each tapered probe means and the respective projection taper form completing said second edging into a trailing edging substantially parallel to the herringbone configuration of the respective leading edgings, and whereby the engagements of same are adapted to hold the laminations during a squirrel cage winding casting operation.

2. The skewing means of claim 1 wherein said projections each has a longitudinal recessing extending at least halfway on said second edging thereof for dovetail interfit of said projections and probe means to form pairs of trailing and leading edges parallel to each other as limit stops for instantaneous internal shift of rotor laminations into a herringbone skew configuration.

3. The skewing means of claim 1 wherein there are three telescopically mating projections and three probe means which collectively effect instantaneous internal shift of slotted rotor laminations to facilitate the casting of a metal squirrel cage windings.

References Cited by the Examiner
FOREIGN PATENTS
4,974   11/1905   Great Britain.

JOHN F. CAMPBELL, *Primary Examiner.*

R. W. CHURCH, *Assistant Examiner.*